(12) United States Patent
Takatori et al.

(10) Patent No.: US 6,599,215 B2
(45) Date of Patent: Jul. 29, 2003

(54) PRE-CHARGE CONTROL SYSTEM OF AUTOMATIC TRANSMISSION

(75) Inventors: Kazuhiro Takatori, Yokohama (JP); Osamu Sato, Kanagawa (JP); Tatsuya Imamura, Kanagawa (JP); Yasushi Fujita, Kanagawa (JP); Kazuo Tomioka, Shizuoka (JP); Kazuhito Sano, Shizuoka (JP)

(73) Assignee: Jatco Ltd, Fuji (JP)

( * ) Notice: Subject to any disclaimer, the term of this patent is extended or adjusted under 35 U.S.C. 154(b) by 1 day.

(21) Appl. No.: 10/042,233

(22) Filed: Jan. 11, 2002

(65) Prior Publication Data

US 2002/0103049 A1 Aug. 1, 2002

(30) Foreign Application Priority Data

Jan. 30, 2001 (JP) ........................................ 2001-021652

(51) Int. Cl.⁷ .............................................. F16H 47/08
(52) U.S. Cl. ........................ 475/70; 475/120; 475/127; 477/121; 477/156
(58) Field of Search ........................ 475/70, 120, 121, 475/118, 127; 477/121, 125, 156

(56) References Cited

U.S. PATENT DOCUMENTS

| | | | | |
|---|---|---|---|---|
| 5,810,694 A | * | 9/1998 | Kamada et al. | 477/150 |
| 5,938,563 A | * | 8/1999 | Nishio et al. | 477/117 |
| 6,520,882 B2 | * | 2/2003 | Saito | 475/127 |
| 2002/0038580 A1 | * | 4/2002 | Horiguchi | |

FOREIGN PATENT DOCUMENTS

JP 11-182579 7/1999

* cited by examiner

Primary Examiner—Sherry Estremsky
Assistant Examiner—Tisha D. Lewis
(74) Attorney, Agent, or Firm—Foley & Lardner

(57) ABSTRACT

A control system for controlling operation of a pre-charge system of an automatic transmission. The control system comprises a first section which receives first and second gear change instructions which are issued in succession. The first and second gear change instructions are of a type of needing an engaged condition of a same friction element. The control system further comprises a second section which, when the second gear change instruction is issued during a pre-charge period of the friction element which is needed by the first gear change instruction, extends the pre-charge period of the friction element to a time when a pre-charge period needed by the second gear change instruction lapses.

9 Claims, 7 Drawing Sheets

FIG. 3

| FRICTION ELEMENT | | Fr/B | 3rd/OWC | I/C | H&LR/C | 1st/OWC | D/C SMALLER DIAMETER PISTON CHAMBER D/C1 | D/C LARGER DIAMETER PISTON CHAMBER D/C2 | R/B | LC/B | Fwd/B | F/OWC |
|---|---|---|---|---|---|---|---|---|---|---|---|---|
| P-RANGE | | ◎ | | | ◎ | | | | | | | |
| N-RANGE | | ◎ | | | ◎ | | | | | | | |
| D-RANGE | 1ST-GEAR SPEED | ◎ | △ | * | (◯)* | △ | | | | (◯) | ◯ | △ |
| | 2ND-GEAR SPEED | (◯) | △ | | | □ | ◯ | | | (◯) | ◯ | △ |
| | 3RD-GEAR SPEED | (◯) | △ | ◯ | ◯ | □ | ◯ | ◯ | | | ◎ | |
| | 4TH-GEAR SPEED | | | ◯ | ◯ | □ | | ◯ | | | ◎ | |
| | 5TH-GEAR SPEED | ◯ | △ | | ◯ | | | | | | ◎ | |
| R-RANGE | | ◯ | | | | △ | | | ◯ | | | |

◯ : ENGAGEMENT (HYDRAULIC PRESSURE APPLICATION)
△ : ACTUAL TRANSMISSION IS EFFECTED ONLY UNDER POWER-ON CONDITION
□ : ACTUAL TRANSMISSION IS EFFECTED ONLY UNDER COAST CONDITION
◎ : ALTHOUGH APPLIED WITH HYDRAULIC PRESSURE, FRICTION ELEMENT DOES NOT PARTICIPATE IN OUTPUT
(◯) : ENGAGED UNDER OVER-RUN MODE
(◯)* : ENGAGED UPON SELECTION, THEREAFTER, RELEASED IN CASE OTHER THAN OVER-RUN MODE
* : ENGAGED ONLY AT INITIAL STAGE OF SPEED CHANGE

PRE-CHARGE CONTROL SYSTEM OF AUTOMATIC TRANSMISSION

BACKGROUND OF THE INVENTION

1. Field of the Invention

The present invention relates in general to pre-charge control systems of an automatic transmission, which, upon issuance of gear change instruction, quicken starting of stroke action of a friction element which is to be engaged, and more particularly to the pre-charge control systems of a type which controls the stroke action of the friction element when various (for example, two) types of gear change instructions, each needing an engaged condition of a same friction element, are issued in succession.

2. Description of the Related Art

As is known, for establishing a desired gear speed in an automatic transmission, friction elements such as clutches and brakes are selectively engaged with the aid of hydraulic power. More specifically, upon issuance of a gear change instruction for a desired gear speed, a switching is carried out from a friction element (or elements) which is to be released to a friction element (or elements) which is to be engaged, for establishing the desired gear speed.

In general, in order to determine a gear speed suitable for the existing driving condition of an associated motor vehicle, a shift map, such as one shown in FIG. 7 is employed. That is, based on such shift map, a controller (viz., computer) looks up a suitable gear speed with reference to drive condition representing factors, such as an engine throttle opening TVO and a vehicle speed VSP, and in accordance with the suitable gear speed thus looked up, the controller carries out a switching from a selected friction element which is to be released to a selected friction element which is to be engaged, for establishing the looked up gear speed.

SUMMARY OF THE INVENTION

In the following, description will be made with respect to a transitional condition of a transmission wherein for carrying out a desired gear change, one friction element is being released by lowering the hydraulic pressure applied thereto and the other friction element is being engaged by increasing the hydraulic pressure applied thereto. An instruction value of hydraulic pressure for one friction element (viz., releasing-side friction element) and that of hydraulic pressure for the other friction element (viz., engaging-side friction element) is denoted by "Po" and "Pc" respectively, which are depicted by a time chart of FIG. 8. For ease of understanding of the following description, the values "Po" and "Pc" will be referred to as releasing-side instruction value and engaging-side instruction value respectively.

First, the engaging-side instruction value "Pc" will be described with reference to the time chart of FIG. 8. As shown in the time chart, for a given period "C1" from time "t1" at which a gear change instruction is issued, the engaging-side instruction value "Pc" is instantly raised like a step and kept high (viz., pre-charge pressure) for the purpose of quickening starting of stroke action of the engaging-side friction element. That is, the given period "C1" is regarded as a given pre-charge period.

Then, for a period "C2" subsequent to the given pre-charge period "C1",the engaging-side instruction value "Pc" is instantly lowered from the pre-charge pressure and gradually increased with a rate of change that does not bring about undesired engaging shock of the engaging-side friction element. The pressure exerted in the period "C2" is thus referred to as a stand-by pressure. It is to be noted that if the stroke action of the friction element is fully carried out by the pre-charge pressure, a marked shift shock is generated upon engagement of the friction element.

At a time "t2",that is, at a terminal end of the period "C2", the stroke action of the engaging-side friction element is finished thereby starting to have an engaging capacity, and thus, the engaging side-friction element starts to enter a torque phase. That is, from time "t2", the engaging-side instruction value "Pc" is increased with an illustrated time series change rate thereby to increase the engaging capacity of the engaging-side friction element.

Next, the releasing-side instruction value "Po" will be described. As shown in the time chart of FIG. 8, for a given period "O1" from time "t1" at which the gear change instruction is issued, the releasing-side instruction value "Po" is instantly lowered like a step and kept at a given level for the purpose of ensuring a releasing response of the releasing-side friction element. Then, for periods "O2" and "O3" subsequent to the period "O1", the releasing-side instruction value "Po" is gradually lowered with a smaller rate of change thereby to control or lower the actual hydraulic pressure in such a manner as to gradually induce a slip operation of the releasing-side friction element.

Then, from time "t2" at which, due to completion of the stroke action, the engaging-side friction element starts to have the engaging capacity, the releasing-side instruction value "Po" is further lowered with an illustrated time series change rate thereby to gradually lower the engaging capacity of the releasing-side friction element.

As is understood from the above description, upon switching operation from the releasing-side friction element to the engaging-side friction element, the torque phase starts at time "t2" and advances until completion of the switching operation thereby to accomplish a desired gear change.

Now, consideration will be directed to a gear change that would take place when, as is indicated by an arrow in the shift map of FIG. 7, an accelerator pedal is depressed for increasing the throttle opening TVO. That is, at a time "t1"of the time chart of FIG. 9 when a shift point line N-1 of the shift map of FIG. 7 is crossed by time "t1", an instruction gear speed becomes (N-1)-speed and thus a gear change instruction for changing from existing N-speed to (N-1)-speed is issued, and then at a time "t2" of the time chart of FIG. 9 when another shift point line N-2 of the shift map of FIG. 7 is crossed by time "t2", an instruction gear speed becomes (N-2)-speed and thus a gear change instruction for changing from the existing N-speed to (N-2)-speed is issued. That is, upon depression of the accelerator pedal in the above-mentioned manner, two gear change instructions, namely, "N→(N-1)" gear change instruction and "N→(N-2)" gear change instruction, are inevitably issued in succession.

However, when the "N→(N-1)" gear change instruction and the "N→(N-2)" gear change instruction, which are issued in succession, are of a type that needs an engaged condition of a same friction element, a known control system carries out an operation wherein the above-mentioned pre-charge control is forced to start at both times "t1" and "t2" of the time chart of FIG. 9. In this case, however, if the pre-charge control starting at time "t1" when the "N→(N-1)" gear change instruction is issued is not finished at time "t2" when the "N→(N-2)" gear change instruction is issued, the period for which the pre-charge control is carried out becomes excessively long and thus the stroke action of the friction element becomes too rapid due to the excessive pre-charging. In this case, engaging shock of the friction element tends to occur, and due to too early engagement of the engaging-side friction element as compared with the releasing of the releasing-side friction element, a gear change shock tends to occur due to an interlock tendency. If, for elimination of this drawback, the pre-charge control is forced to finish at time "t2" when the "N→(N-2)" gear change instruction would be issued, the stroke action of the engaging-side friction element becomes slow due to lack of the pre-charging period, which tends to induce undesired engine roaring.

It is therefore an object of the present invention to provide a pre-charge control system of an automatic transmission, which is free of the above-mentioned drawbacks.

According to a first aspect of the present invention, there is provided a pre-charge control system for use in an automatic transmission. The transmission includes a plurality of friction elements which are selectively engageable to establish various gear speeds, a gear change system which, upon issuance of a gear change instruction, applies hydraulic pressure to selected one of the friction elements to induce an engaged condition of the same thereby to establish a certain gear speed and a pre-charge arrangement which, for quickening starting of engaging stroke of the friction element in the gear change operation, raises an instruction value of hydraulic pressure for the selected friction element to a pre-charge pressure value upon issuance of the gear change instruction and keeps the instruction value at the pre-charge pressure value for a pre-charge period. The pre-charge control system controls operation of the pre-charge system and comprises a first section which receives first and second gear change instructions which are issued in succession, the first and second gear change instructions being of a type of needing an engaged condition of the friction element; and a second section which, when the second gear change instruction is issued during a pre-charge period of the friction element which is needed by the first gear change instruction, extends the pre-charge period of the selected friction element to a time when a pre-charge period needed by the second gear change instruction lapses.

According to a second aspect of the present invention, there is provided a pre-charge control system for use in an automatic transmission. The transmission includes a friction element of a double piston type having two pistons, a gear change system which, upon issuance of a gear change instruction, induces an engaged condition of the friction element to establish a certain gear speed of the transmission and a pre-charge system which, for quickening starting of engaging stroke of the friction element, raises an instruction value of hydraulic pressure for the friction element to a pre-charge pressure value upon issuance of the gear change instruction and keeps the instruction value at the pre-charge pressure value for a pre-charge period. The pre-charge control system controls operation of the pre-charge system and comprises a first section which receives first and second gear change instructions which are issued in succession, the first and second gear change instructions being of a type of needing the engaged condition of the friction element; and a second section which, when the second gear change instruction is issued during a pre-charge period of the friction element which is needed by the first gear change instruction, extends the pre-charge period of the friction element to a time when a pre-charge period needed by the second gear change instruction lapses.

BRIEF DESCRIPTION OF THE DRAWINGS

Other objects and advantages of the present invention will become apparent from the following description when taken in conjunction with the accompanying drawings, in which:

FIG. 3 is a table showing a relationship between conditions of friction elements of the automatic transmission and gear ranges and speeds which the automatic transmission assumes;

DETAILED DESCRIPTION OF THE EMBODIMENT

In the following, an embodiment of the present invention will be described in detail with reference to the accompanying drawings.

Figure 1:
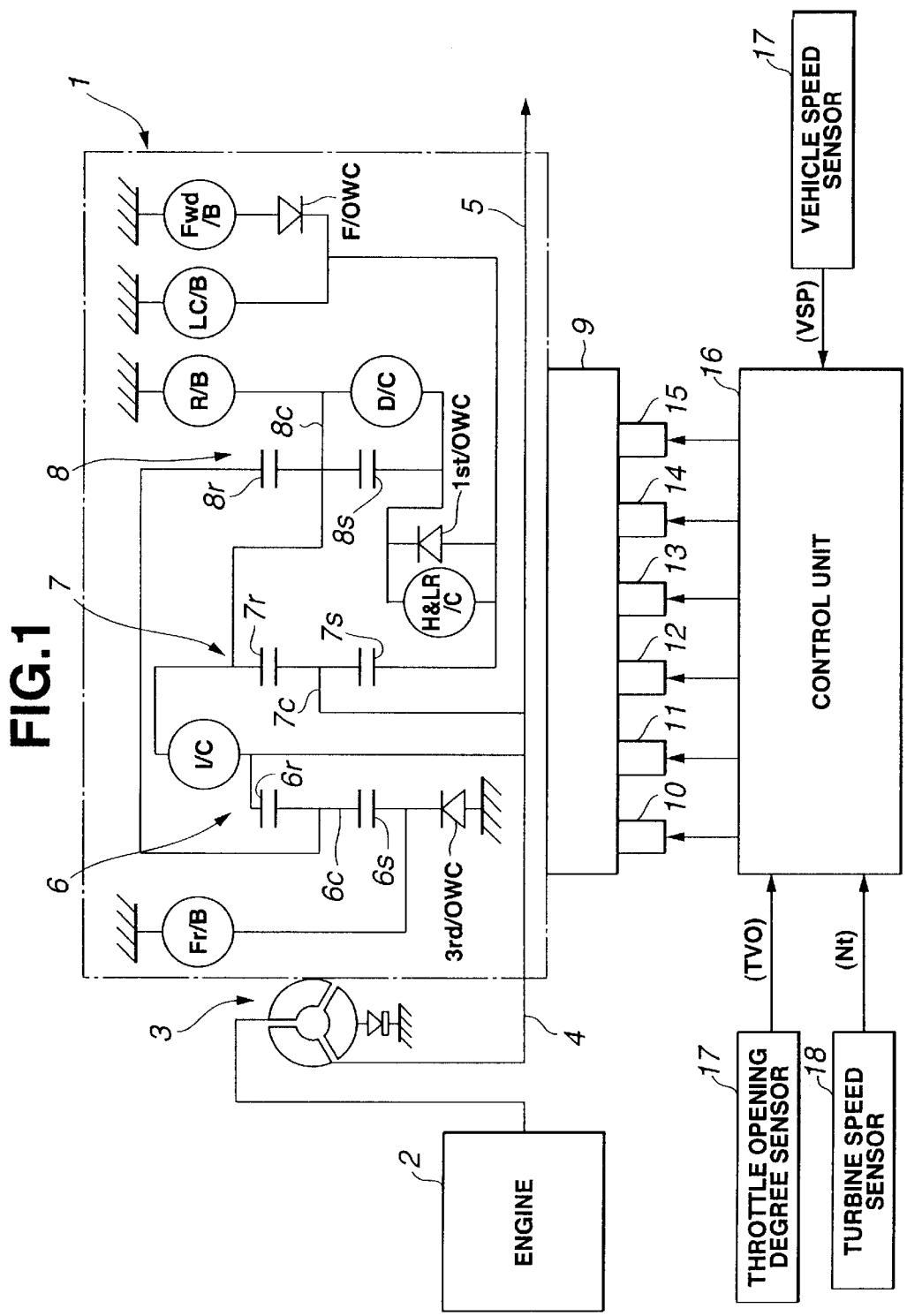
FIG. 1 is a schematic diagram of an automatic transmission to which a pre-charge control system of the present invention is practically applied.

Referring to FIG. 1, there is schematically shown an automotive automatic transmission 1 to which a pre-charge control system of the present invention is practically applied.

In the drawing, denoted by numeral 2 is an internal combustion engine whose output shaft is connected to an input part of the transmission 1 through a torque converter 3.

The engine 2 has a throttle valve (not shown) which pivots between a full-close position and a full-open position in accordance with movement of an accelerator pedal operated by a driver. That is, the output of the engine 2 is controlled in accordance with open degree of the throttle valve. That is, the output of the engine 2 is transmitted to the torque converter 3 and then to an input shaft 4 of the transmission 1, as shown.

In the automatic transmission 1, the input shaft 4 is arranged coaxial with an output shaft 5. About a common axis of the input and output shafts 4 and 5, there are coaxially arranged first, second and third planetary gear units 6, 7 and 8. As shown, the first planetary gear unit 6 is positioned nearest to the engine 2 and the second planetary gear unit 7 is positioned between the first and third planetary gear units 6 and 8.

Each of the first, second and third planetary gear units 6, 7 and 8 is of a simple type which comprises a first, second or third sun gear 6s, 7s or 8s, a first, second or third ring gear 6r, 7r or 8r and a first, second or third carrier 6c, 7c or 8c. As is known, each carrier 6c, 7c or 8c carries pinions that are engaged between the sun gear 6s, 7s or 8s and the ring gear 6r, 7r or 8r.

The first ring gear 6r is connected with the input shaft 4 and the second carrier 7c is connected with the output shaft 5.

The first ring gear 6r and the input shaft 4 are connectable to both the second ring gear 7r and the third carrier 8c through an input clutch I/C. The second ring gear 7r and the third carrier 8c are fixedly connectable to a case of the transmission 1 through a reverse brake R/B, and connectable to the third sun gear 8s through a direct clutch D/C.

Due to provision of a third one-way clutch 3rd/OWC, the first sun gear 6s is suppressed from rotation in a direction opposite to that of the output shaft of the engine 2. The first sun gear 6s is fixedly connectable to the case of the transmission 1 through a front brake Fr/B.

The first carrier 6c is connected with the third ring gear 8r to rotate therewith like a single unit. Due to provision of a forward one-way clutch F/OWC, the second sun gear 7s is suppressed from rotation in a direction opposite to that of the engine output shaft under engagement of a forward brake Fwd/B. Upon engagement of a low coast brake LC/B, the second sun gear 7s becomes fixed thereby to be prevented from rotation in a direction in which the forward one-way clutch F/OWC makes idle rotation.

Due to provision of a high and low reverse clutch H&LR/C, the second sun gear 7s is connectable with the third sun gear 8s. Due to provision of a first one-way clutch 1st/OWC, the third sun gear 8s is connectable to the second sun gear 7s. That is, due to function of the first one-way clutch 1st/OWC, the third sun gear 8s can transmit the engine rotation to the second sun gear 7s.

Figure 2:
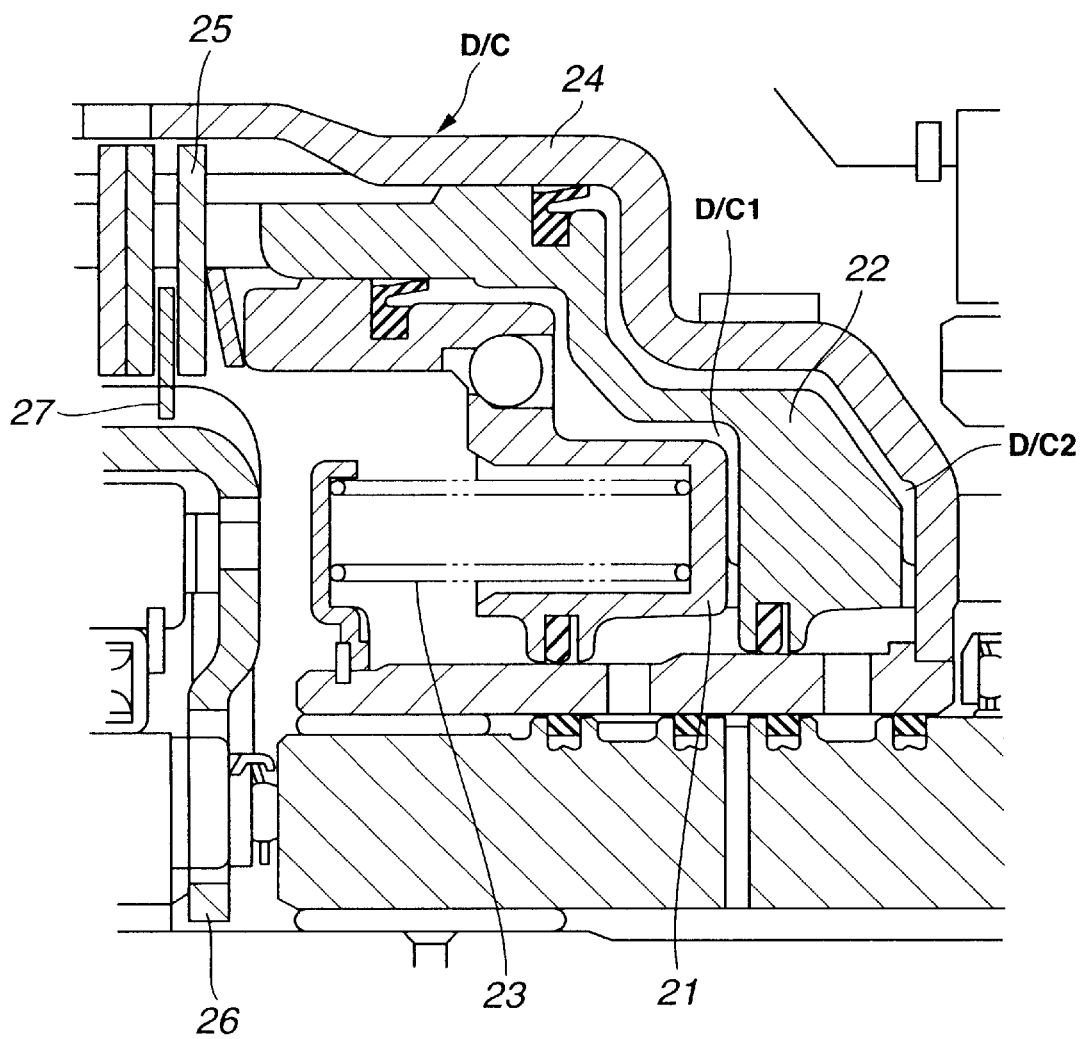
FIG. 2 is an enlarged sectional view of a part of the automatic transmission, where a double piston type direct clutch is arranged.

The detail of the direct clutch D/C is shown in FIG. 2, which is clearly described in Laid-open Japanese Patent Application (Tokkai-hei) 11-182579.

As shown in FIG. 2, the direct clutch D/C employed in the transmission 1 is of a double piston type, which comprises a smaller diameter piston 21 and a larger diameter piston 22 which are arranged in tandem. These pistons 21 and 22 are slidably received in smaller and larger diameter piston chambers D/C1 and D/C2 respectively. Due to function of a return spring 23, the pistons 21 and 22 are biased toward inoperative or disengaged positions as shown in the drawing.

When a hydraulic pressure is applied to only the smaller diameter piston chamber D/C1, the smaller diameter piston 21 is moved leftward in the drawing against the force of the return spring 23 thereby to frictionally engage clutch discs 25 of a clutch drum 24 with clutch discs 27 of a clutch hub 26. Upon this, the clutch drum 24 and the clutch hub 26 become united thereby causing the direct clutch D/C to assume an engaged condition.

While, when the hydraulic pressure is applied to the larger diameter piston chamber D/C2 as well as the smaller diameter piston chamber D/C1, both the smaller and larger diameter pistons 21 and 22 are moved leftward in the drawing against the force of the return spring 23 for establishing the engaged condition of the direct clutch D/C. However, in this case, the engaging capacity of the direct clutch D/C is increased by a degree corresponding to the pressing force produced by the larger diameter piston 22.

Accordingly, the direct clutch D/C can have two operation modes which are different in engaging capacity. As will be described in the following, the two operation modes of the direct clutch D/C are selectively used for each gear speed in accordance with an engaging capacity needed.

FIG. 3 is a table showing various gear ranges and speeds of the transmission 1 which can be provided by controlling the friction elements, namely, the above-mentioned clutches and brakes. Parking range and Neutral range are denoted by P-range and N-range respectively. D-range denotes Drive range which includes 1st, 2nd, 3rd, 4th and 5th gear speeds, as shown. R-range denotes Reverse range.

As is seen from the table of FIG. 3, a designated case wherein "5→4" downshift instruction needing a condition change of the direct clutch D/C from a released condition to engaged condition and "5→3" downshift instruction needing the same condition change of the direct clutch D/C are issued in succession corresponds to the case to which the pre-charge control of the present invention is practically applied. That is, in the designated case, the direct clutch D/C is subjected to the engaged condition twice in a short time.

In the direct clutch D/C, the engaging capacity needed at the 3rd or 2nd gear speed is larger than that needed at the 4th gear speed. Thus, in the 4th gear speed, the hydraulic pressure is applied to only the smaller diameter piston chamber D/C1, while, in the 3rd or 2nd gear speed, the hydraulic pressure is applied to both the smaller and larger diameter piston chambers D/C1 and D/C2.

Referring back to FIG. 1, denoted by numeral 9 is a control valve unit which controls operation of the friction elements in such a manner as is shown in the table of FIG. 3 for establishing the above-mentioned gear ranges and gear speeds. The control valve unit 9 comprises a manual valve (not shown) through which a driver can select a desired gear range. In addition to this manual valve, the control valve unit 9 comprises a solenoid 10 which controls the hydraulic pressure fed to the front brake Fr/B, a solenoid 11 which controls the hydraulic pressure fed to the input clutch I/C, a solenoid 12 which controls the hydraulic pressure fed to the high and low reverse clutch H&LR/C, a solenoid 13 which controls the hydraulic pressure fed to the direct clutch D/C, a solenoid 14 which controls the hydraulic pressure fed to the low coast brake LC/B and a solenoid 15 which controls the hydraulic pressure fed to the forward brake Fwd/B.

Figure 4:
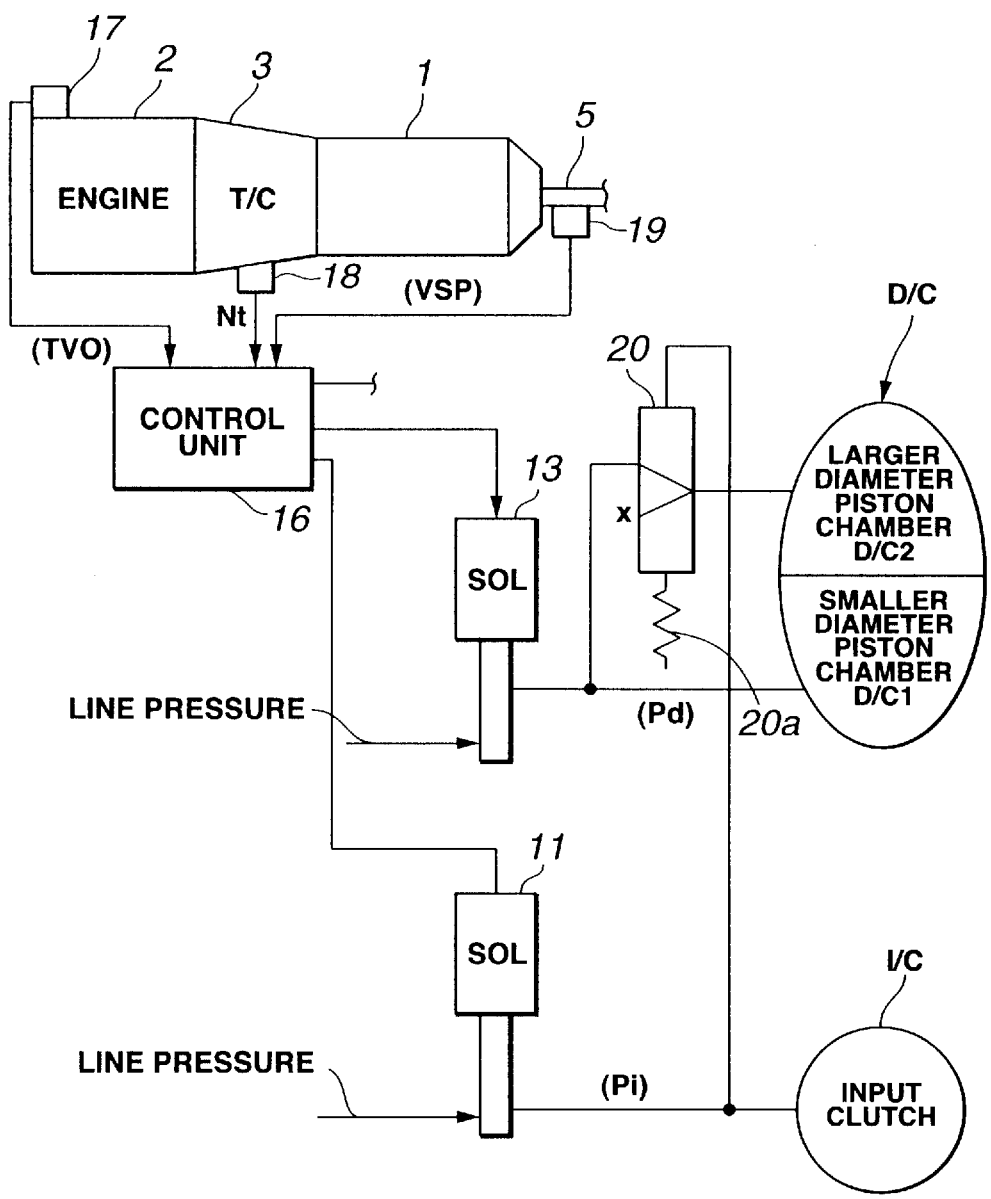
FIG. 4 is a schematic view of a hydraulic pressure control circuit associated with the double piston type direct clutch of the automatic transmission.

As will be understood from the input clutch solenoid 11 and direct clutch solenoid 13 shown in FIG. 4, for controlling the hydraulic pressure fed to the corresponding friction element, each of the above-mentioned solenoids 10 to 15 carries out a duty control processing to a line pressure produced in the transmission 1.

As shown in the table of FIG. 3, in the R-range, the reverse brake R/B assumes an engaged condition. In this R-range, the manual valve is operated to directly feed the reverse brake R/B with the line pressure. However, in this R-range, the other friction elements which are to be engaged are each applied with a hydraulic pressure which is subjected to the duty control.

In P-range and N-range, the front brake Fr/B and the high and low reverse clutch H&LR/C are controlled to assume their engaged conditions for a convenience of the control. That is, a neutral condition of the transmission 1 is achieved by released condition of the other friction elements.

Referring back to FIG. 1, denoted by numeral 16 is a control unit which carries out the duty control of the solenoids 10 to 15. As is seen from this drawing, into the control unit 16, there are fed an information signal TVO issued from a throttle opening sensor 17, an information signal Nt issued from a turbine speed sensor 18 and an information signal VSP issued from a vehicle speed sensor 17. Specifically, the information signal TVO represents the throttle opening degree of the engine 2, the information signal Nt represents the output speed of the torque converter 3 and the information signal VSP represents the vehicle speed.

As is seen from FIG. 4, the input clutch hydraulic pressure Pi controlled by the input clutch solenoid 11 is directly fed to the input clutch I/C.

The direct clutch hydraulic pressure Pd controlled by the direct clutch solenoid 13 is directly fed to the smaller diameter piston chamber D/C1 of the direct clutch D/C without being controlled, while the direct clutch hydraulic pressure Pd is suitably fed to the larger diameter piston chamber D/C2 under control of a engaging capacity switching valve 20.

As shown, when the input clutch hydraulic pressure Pi is fed to the input clutch I/C, that is, under the 4th or 5th gear speed of the transmission 1 as is understood from the table of FIG. 3, the engaging capacity switching valve 20 is affected by the pressure Pi to assume a drain position to connect the larger diameter piston chamber D/C2 of the direct clutch D/C with a drain passage. While, when the input clutch hydraulic pressure Pi is not fed to the input clutch I/C, the switching valve 20 assumes a pressure feeding position due to function of a biasing spring 20a, wherein the direct clutch hydraulic pressure Pd from the direct clutch solenoid 13 is fed to the larger diameter piston chamber D/C2 of the direct clutch D/C.

Accordingly, as is understood from the above and the table of FIG. 3, in the 2nd or 3rd gear speed, increased engaging capacity is obtained by the direct clutch D/C as is needed, and in the 4th gear speed, reduced engaging capacity is obtained as is needed.

In the following, with the aid of the flowchart of FIG. 5 and the time-chart of FIG. 6, the pre-charge control of the present invention will be described with respect to the above-mentioned designated case wherein under the 5th gear speed, the "5→4" downshift instruction needing the engaged condition of the direct clutch D/C and the "5→3" downshift instruction needing the engaged condition of the direct clutch D/C are issued in succession, that is, at times "t1" and "t2".

The pre-charge control of the invention is carried out by the control unit 16. As will be come apparent as the description proceeds, the control unit 16 functions to provide an instruction value "Pdo" of hydraulic pressure for the direct clutch D/C, that is needed to determine the drive duty of the direct clutch solenoid 13. That is, in the designated case, the instruction value "Pdo" is controlled to follow the characteristic path shown by the solid line in the time-chart of FIG. 6.

Figure 5:
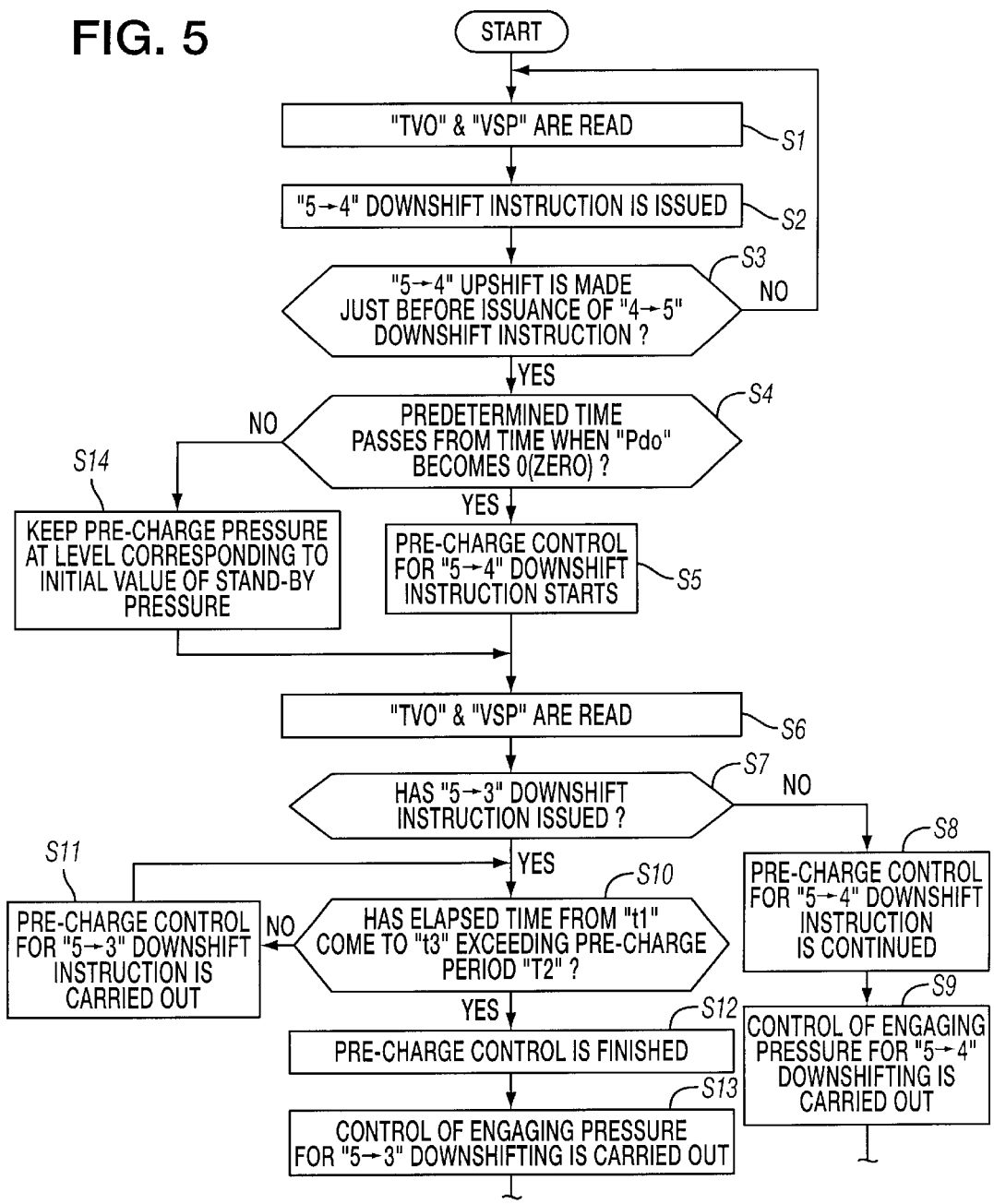
FIG. 5 is a flowchart showing programmed operation steps for executing a pre-charge control according to the present invention.

In the flowchart of FIG. 5, at step S1, the throttle opening TVO and the vehicle speed VSP are read, and at step S2, determination is so made that "5→4" downshift instruction has issued. That is, when, with the transmission 1 being in the 5th gear speed, the 4th gear speed is looked up from a predetermined shift map with reference to the throttle opening TVO and the vehicle speed VSP, such "5→4" downshift instruction is issued.

Upon this, the pre-charge control of the present invention is applied to the direct clutch D/C in the following manner.

At step S3, judgement is carried out as to whether or not a "4→5" upshifting has taken place just before issuance of the "5→4" downshift instruction. If NO, that is, when the "4→5" upshifting has not taken place just before the issuance, the operation flow goes back to step S1. While, if YES, that is, when the "4→5" upshifting has taken place just before the issuance, the operation flow goes to step S4. At this step S4, judgement is carried out as to whether or not a predetermined time has passed from a time when the instruction value "Pdo" of hydraulic pressure for the direct clutch D/C became 0 (zero). It is to be noted that the predetermined time corresponds to a minimum time which is to pass from the time when the instruction value "Pdo" becomes 0 (zero) to a time when, due to discharge of the hydraulic pressure, the direct clutch D/C finishes its return stroke. Thus, when the direct clutch D/C finishes the return stroke with no hydraulic pressure left therein, the step S4 issues YES sign, while, when the direct clutch D/C does not finish the return stroke with some hydraulic pressure left therein, the step S4 issues NO sign.

If NO at step S4, that is, when it is judged that the return stroke of the direct clutch D/C has not finished, the operation flow goes to step S14. Upon this, a pre-charge pressure is kept at a level corresponding to an initial value of a stand-by pressure, as will be described in detail hereinafter. Then, the operation flow goes to step S6 which will be described hereinafter.

If YES at step S4, that is, when it is judged that the return stroke of the direct clutch D/C has finished, the operation flow goes to step S5. At this step S5, an essential operation of the pre-charge control of the direct clutch D/C for the "5→4" downshift instruction starts.

As is seen from the time-chart of FIG. 6, the pre-charge control for the "5→4" downshift instruction is carried out in the following manner.

That is, at time "t1" when the "5→4" downshift instruction is issued, the instruction value "Pdo" of hydraulic pressure is instantly raised from zero level to such a level "Pr1" as indicated by the two-dot chain line "α". More specifically, the control at step S5 is so made as to raise the instruction value "Pdo" to the level "Pr1" and keep the same at the level "Pr" for a pre-charge period "T1".

Referring back to the flowchart of FIG. 5, at step S6, the throttle opening TVO and the vehicle speed VSP are read. Then, at step S7, judgement is carried out as to whether "5→3" downshift instruction has issued or not. That is, when, with the transmission being in the 5th gear speed, the 3rd gear speed is looked up from the predetermined shift map with reference to the throttle opening TVO and the vehicle speed VSP, such "5→3" downshift instruction is issued.

Figure 8:
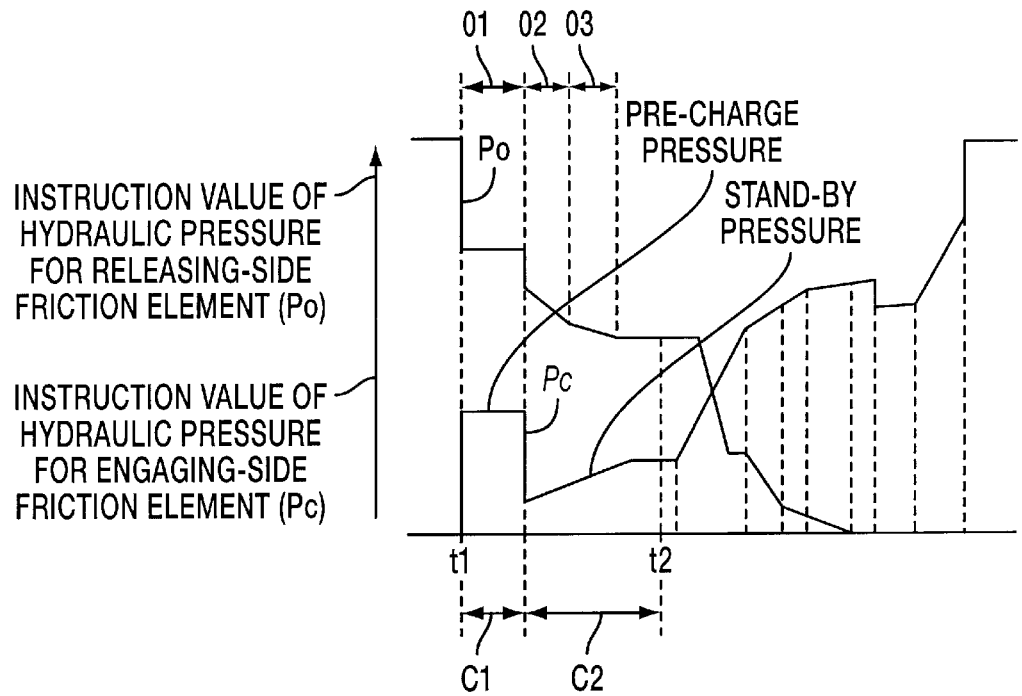
FIG. 8 is a time chart showing manner of hydraulic pressures applied to two types of friction elements during a gear change operation.
Figure 9:
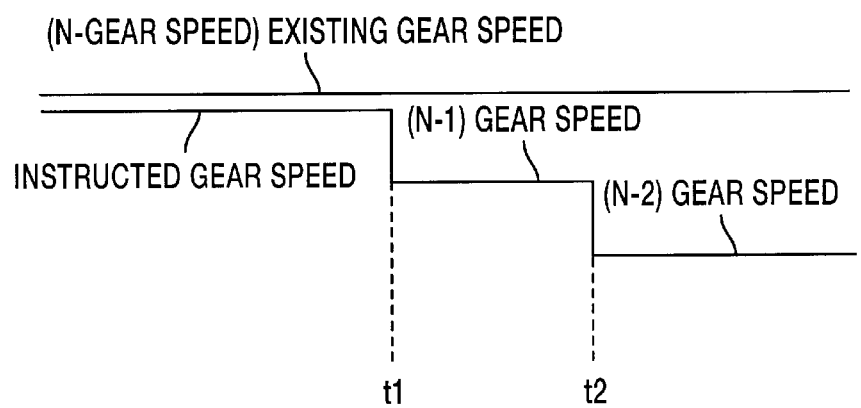
FIG. 9 is a time chart showing two gear change instructions which would be issued in succession when, with the shift map of FIG. 7 being actually applied, the throttle opening is increased.

If NO at step S7, that is, when the "5→3" downshift instruction has not issued after issuance of the "5→4" downshift instruction, the operation flow goes to step S8. At this step S8, the pre-charge control for the "5→4" downshift instruction is continued. That is, as is seen from the time-chart of FIG. 6, the instruction value "Pdo" is forced to keep the pre-charge control for the "5→4" downshift instruction as is indicated by the two-dot chain line "α". At step S9, control of engaging pressure for the direct clutch D/C for the "5→4" downshifting is carried out. In this engaging pressure control, the instruction value "Pdo" may be forced to follow a certain characteristic path, such as the path "Pc" of the above-mentioned time-table of FIG. 8. That is, in this case, the instruction value "Pdo" is instantly lowered to the stand-by pressure and then gradually increased as is shown in the table of FIG. 8.

If YES at step S7, that is, when the "5→3" downshift instruction has issued after issuance of the "5→4" downshift instruction, the operation flow goes to step S10. At this step S10, judgment is carried out as to whether or not an elapsed time from time "t1" has come to time "t3" exceeding a pre-charge period "T2" that is set for the "5→3" downshift instruction.

If the elapsed time is within the pre-charge period "T2" for the "5→3" downshifting, that is, if the elapsed time is in a range between time "t2" when the "5→3" downshift instruction has issued and time "t3" when the pre-charge period "T2" has elapsed from time "t1", the step S10 issues NO sign and the operation flow goes to step S11. At this step S11, a pre-charge control for the "5→3" downshifting is carried out for a pre-charge period "T3". That is, in this control, the instruction value "Pdo" of hydraulic pressure for the direct clutch D/C is determined to "Pr2" for the "5→3" downshift instruction.

If YES at step S10, that is, when the elapsed time from time "t1" has come to time "t3", the operation flow goes to step S12 to finish the pre-charge control, and then the operation flow goes to step S13. At this step S13, control of engaging pressure for the direct clutch D/C for the "5→3" downshifting is carried out. In this engaging pressure control, the instruction value "Pdo" may be forced to follow a certain characteristic path, such as the path "Pc" of the above-mentioned time-table of FIG. 8. That is, in this case, the instruction value "Pdo" is instantly lowered to the stand-by pressure and then gradually increased as is shown in the table of FIG. 8.

As will be understood from the above description, when two types of gear change instructions (viz., "5→4" downshift instruction and "5→3" downshift instruction), each needing engagement of the same friction element (viz., direct clutch D/C), are issued in succession, that is, at time "t1" and time "t2" in the time table of FIG. 6 and when the later gear change instruction (viz., "5→3" downshift instruction) is issued (at time "t2") during the pre-charging of the friction element that is induced by the prior gear change instruction (viz., "5→4" downshift instruction), the pre-charge control is continued from time "t1" to time "t3" exceeding the pre-charge period "T2" that is needed by the later gear change instruction (viz., "5→3" downshift instruction). With this control, the instruction value "Pdo" of hydraulic pressure for the direct clutch D/C can follow the characteristic path shown by the solid line in FIG. 6.

That is, in the present invention, the pre-charge control to the direct clutch D/C is extended by a period from time "t2" when the later gear change instruction is issued to time "t3" when the pre-charge period "T2" needed by the later gear change instruction lapses. In other words, in the present invention, it does not occur that upon issuance of a later gear change instruction, one pre-charge control induced by a prior gear change instruction is enforcedly stopped or another pre-charge control for the later gear change instruction starts, which would take place in a conventional control system.

Thus, in the present invention, as a whole, the pre-charge period for the direct clutch D/C can correspond to the period "T2" needed by the later gear change instruction, and thus, undesirable shift shock and engine racing, which would be caused by lack/surplus of pre-charge period, can be avoided.

Furthermore, in the present invention, at time "t2" when the later gear change instruction is issued, the pre-charge pressure for the direct clutch D/C is instantly raised to and kept at the level "Pr2" that is needed by the later gear change instruction. The slightly high pre-charge pressure induced by the later gear change instruction agrees with the existing need by the direct clutch D/C.

Figure 6:
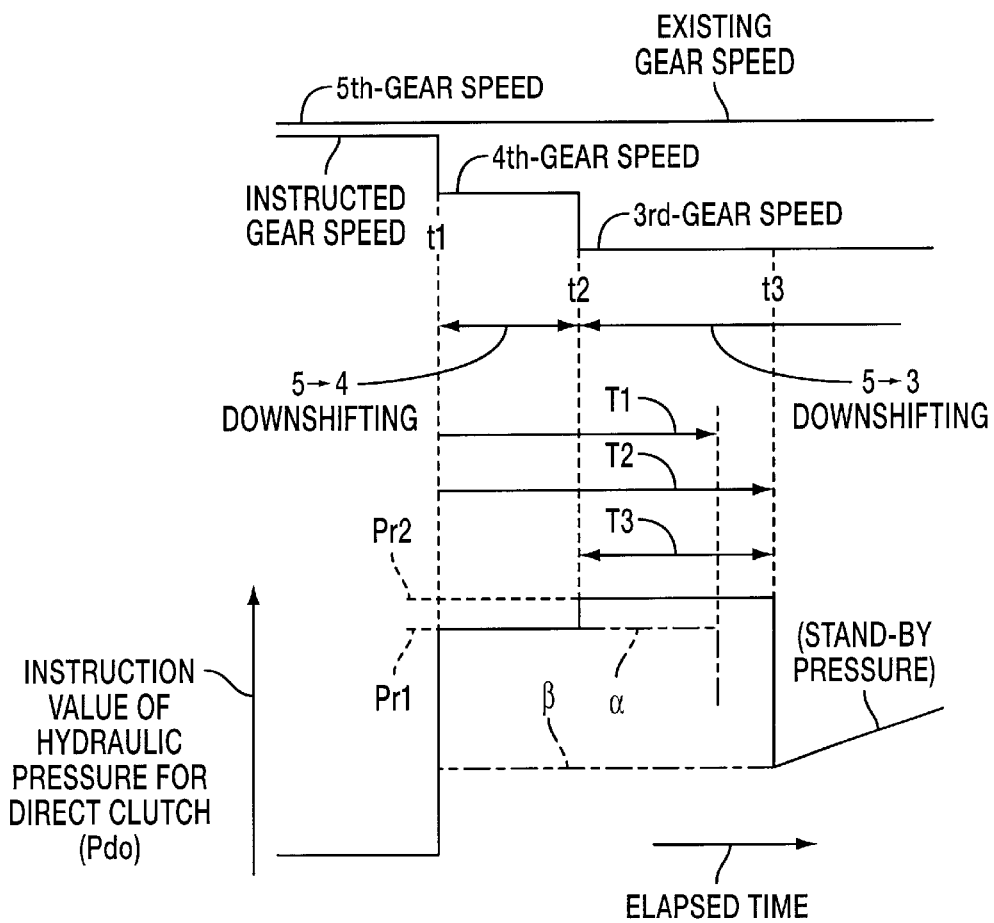
FIG. 6 is a time chart depicting the pre-charge control according to the present invention.
Figure 7:
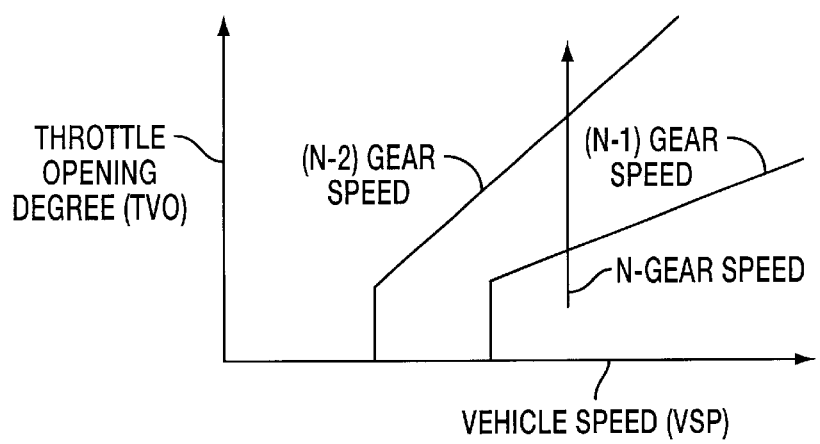
FIG. 7 is a shift map showing an exemplified shift pattern of an automotive transmission.

Referring back to the flowchart of FIG. 5, if NO at step S4, that is, when it is judged that the return stroke of the direct clutch D/C has not finished due to residual pressure in the direct clutch D/C caused by the just previous "4→5" upshifting, the operation flow goes to step S14 to keep the pre-charge pressure at a level of the chain line "β" which corresponds to an initial value of the stand-by pressure, as shown in the table of FIG. 6. After this, the operation flow goes to step S6.

Under such case, the pre-charge control for the direct clutch D/C at step S8 or S11 is made that the instruction value "Pdo" of hydraulic pressure follows a characteristic path shown by the chain line "β" of the time-table of FIG. 6.

Accordingly, when "4→5" upshifting for releasing the direct clutch D/C is carried out just before issuance of a prior gear change instruction (viz., "5→4" downshift instruction) and the direct clutch D/C does not finish the return stroke, due to residual pressure therein, within a predetermined time from the completion of the "4→5" upshifting, the pre-charge pressure of the direct clutch D/C is lowered to avoid rapid engagement of the direct clutch D/C. With this measure, undesirable shift shock can be prevented.

As is described in the section of step S4 of the flowchart of FIG. 5, judgment for completion of the "4→5" upshifting effected just before the prior gear change instruction (viz., "5→4" downshift instruction) is made based on the time when the instruction value "Pdo" of hydraulic pressure for the direct clutch D/C becomes 0 (zero). Accordingly, condition of the residual pressure left in the direct clutch D/C is clearly sensed as compared with in a case wherein the condition would be judged by the existing gear ratio assumed by the transmission. This promotes the above-mentioned advantageous operation of the invention.

In the present invention, the direct clutch D/C used is of a double piston type (see FIG. 2). Upon issuance of the prior gear change instruction (viz., "5→4" downshift instruction), the smaller diameter piston chamber D/C1 is applied with hydraulic pressure to bring about a low power engaged condition of the direct clutch D/C by the smaller diameter piston 21, and upon issuance of the later gear change instruction (viz., "5→3" downshift instruction) that takes place subsequent to the prior gear change instruction, the larger diameter piston chamber D/C2 is also applied with hydraulic pressure to bring about a high power engaged condition of the direct clutch D/C by both the larger and smaller diameter pistons 22 and 21. Furthermore, in the present invention, as is seen from the time-table of FIG. 6, the pre-charge time "T2" of the direct clutch D/C needed by the later gear change instruction (viz., "5→3" downshift instruction) is set longer than the pre-charge time "T1" needed by the prior gear change instruction (viz., "5→4" downshift instruction). Accordingly, even in case of issuance of the later gear change instruction ("5→3" downshift instruction) wherein the double piston type direct clutch D/C needs a larger amount of hydraulic fluid for its engaging stroke, sufficient amount of hydraulic pressure can be applied to the direct clutch D/C thereby to suppress undesired delayed stoke of the clutch D/C and thus prevent the engine from racing.

The entire contents of Japanese Patent Application 2001-021652 (filed Jan. 30, 2001) are incorporated herein by reference.

Although the invention has been described above with reference to the embodiment of the invention, the invention is not limited to such embodiment as described above. Various modification and variations of such embodiment may be carried out by those skilled in the art, in light of the above description.

What is claimed is:

1. In an automatic transmission including a plurality of friction elements which are selectively engageable to establish various gear speeds, a gear change system which, upon issuance of a gear change instruction, applies hydraulic pressure to selected one of said friction elements to induce an engaged condition of the same thereby to establish a certain gear speed and a pre-charge system which, for quickening starting of engaging stroke of the selected friction element in the gear change operation, raises an instruction value of hydraulic pressure for said selected friction element to a pre-charge pressure value upon issuance of said gear change instruction and keeps said instruction value at said pre-charge pressure value for a pre-charge period, a pre-charge control system for controlling operation of said pre-charge system, comprising:

a first section which receives first and second gear change instructions which are issued in succession, said first and second gear change instructions being of a type of needing an engaged condition of said selected friction element; and a second section which, when said second gear change instruction is issued during a pre-charge period of said selected friction element which is needed by said first gear change instruction, extends the pre-charge period of said friction element to a time when a pre-charge period needed by said second gear change instruction lapses.

2. A pre-charge control system as claimed in claim 1, in which, when said second gear change instruction is issued, said second section changes the pre-charge pressure value of said selected friction element needed by said first gear change instruction to that needed by said second gear change instruction.

3. A pre-charge control system as claimed in claim 2, in which the pre-charge pressure value needed by said second gear change instruction is higher than that needed by said first gear change instruction.

4. A pre-charge control system as claimed in claim 3, in which the pre-charge period of said selected friction element needed by said second gear change instruction is longer than that needed by said first gear change instruction.

5. A pre-charge control system as claimed in claim 1, in which said selected friction element is of a double piston type having two pistons for establishing low-power and high-power engaged conditions of said selected friction element which are different in engaging capacity, and in which upon issuance of said first gear change instruction, one of said pistons is actuated to establish said low-power engaged condition and upon issuance of said second gear change instruction subsequent to said first gear change instruction, both of said pistons are actuated to establish said high-power engaged condition.

6. A pre-charge control system as claimed in claim 1, in which when, prior to issuance of said first gear change instruction, a certain gear change is carried out to establish a released condition of said selected friction element and when, after issuance of said first gear change instruction, said selected friction element fails to finish its return stroke toward the released condition, said second section controls the pre-charge pressure value of said selected friction element to an initial value of a stand-by pressure with which the stroke of said selected friction element is advanced.

7. A pre-charge control system as claimed in claim 6, in which said second section judges completion of said certain gear change when the instruction value of hydraulic pressure for said selected friction element becomes 0 (zero).

8. In an automatic transmission including a friction element of a double piston type, a gear change system which, upon issuance of a gear change instruction, induces an engaged condition of said friction element to establish a certain gear speed of the transmission and a pre-charge system which, for quickening starting of engaging stroke of said friction element, raises an instruction value of hydraulic pressure for said friction element to a pre-charge pressure value upon issuance of said gear change instruction and keeps said instruction value at said pre-charge pressure value for a pre-charge period, a pre-charge control system for controlling operation of said pre-charge system, comprising:

a first section which receives first and second gear change instructions which are issued in succession, said first and second gear change instructions being of a type of needing the engaged condition of said friction element; and a second section which, when said second gear change instruction is issued during a pre-charge period of said friction element which is needed by said first gear change instruction, extends the pre-charge period of said friction element to a time when a pre-charge period needed by said second gear change instruction lapses.

9. A pre-charge control system as claimed in claim 8, in which, upon issuance of said first gear change instruction, one of two pistons of said double piston type friction element is actuated to establish a low-power engaged condition of the friction element and upon issuance of said second gear change instruction subsequent to said first gear change instruction, both of the two pistons of said double piston type friction element are actuated to establish a high-power engaged condition of the friction element.

\* \* \* \* \*